US012420579B1

(12) United States Patent
Xu

(10) Patent No.: US 12,420,579 B1
(45) Date of Patent: Sep. 23, 2025

(54) WRITING UTENSIL WITH OPPOSING MAGNETS

(71) Applicant: AE Creative Concepts Co., Limited, Tsuen Wan (HK)

(72) Inventor: Hanqi Xu, Hangzhou (CN)

(73) Assignee: AE Creative Concepts Co., Limited, Tsuen Wan (HK)

( * ) Notice: Subject to any disclaimer, the term of this patent is extended or adjusted under 35 U.S.C. 154(b) by 0 days.

(21) Appl. No.: 19/013,829

(22) Filed: Jan. 8, 2025

(30) Foreign Application Priority Data

Aug. 16, 2024 (CN) ......................... 202422007697.7

(51) Int. Cl.
*B43K 8/00* (2006.01)
*B43K 29/00* (2006.01)
*B43K 29/007* (2006.01)
*H01F 7/20* (2006.01)

(52) U.S. Cl.
CPC ............ *B43K 8/003* (2013.01); *B43K 29/007* (2013.01); *H01F 7/20* (2013.01); *B43K 29/00* (2013.01)

(58) Field of Classification Search
CPC ...... B43K 8/003; B43K 29/007; B43K 29/00; B43K 29/004; H01F 7/20
USPC .......................................................... 401/195
See application file for complete search history.

(56) References Cited

U.S. PATENT DOCUMENTS

| | | | | |
|---|---|---|---|---|
| 4,435,099 | A * | 3/1984 | Murahara | B43K 5/18 401/241 |
| 5,505,553 | A * | 4/1996 | Saviano | B43K 23/004 401/117 |
| 8,100,598 | B2 | 1/2012 | Killion et al. | |
| 9,676,224 | B2 | 6/2017 | Gardner | |
| 10,787,023 | B2 | 9/2020 | Brand et al. | |
| 12,122,180 | B2 | 10/2024 | Chan et al. | |
| 2012/0057920 | A1 | 3/2012 | Rolion | |

FOREIGN PATENT DOCUMENTS

GB 2235658 3/1991

OTHER PUBLICATIONS

Allocacoc Fidget Pen, Uploaded to https://www.youtube.com/watch?v=M3FG6C374_4 by Check It Out on Sep. 5, 2019.

* cited by examiner

*Primary Examiner* — David J Walczak
(74) *Attorney, Agent, or Firm* — Neal, Gerber & Eisenberg LLP

(57) ABSTRACT

A writing utensil such as a pen having multiple magnetic members along its barrel. The magnetic members have opposite polarity so as to drive each other away. One of the magnetic members may be bonded to the barrel while the other extends around it to form a ring with an inner circumference large to allow it to move along the barrel between the bonded magnetic member and a capturing mechanism at a top end of the barrel. The capturing mechanism may have a metal member to retain the floating magnetic member for temporary storage.

20 Claims, 8 Drawing Sheets

WRITING UTENSIL WITH OPPOSING MAGNETS

CROSS-REFERENCE

This application claims priority to Chinese Patent Application No. 202422007697.7 filed on Aug. 16, 2024, the contents of which is incorporated herein by reference in its entirety.

TECHNICAL FIELD

The present invention relates to writing utensils, and particularly to writing utensils with decorative or ornamental features for use as promotional items.

BACKGROUND

Writing utensils, such as pens, pencils, markers and the like, are well known. They usually have a barrel containing some writing medium (ink cartridge, pencil lead, etc.), a writing end with a tip through which the medium extends for writing on a substrate, and an opposite end with an eraser or, in the case of a pen, often an ejector that one presses to cause the writing tip to extend from or (alternatively) retract into the barrel. The ejector is connected to a spring internal to the barrel that causes the writing tip to eject or retract.

Writing utensils are generally inexpensive, commonly used, and provide a useful surface along the barrel on which to present a brand name, logo or slogan. As a result, writing utensils are often used as promotional items to advertise a company or product by placing the company's name or indicia on the barrel and providing the writing utensil to customers at no cost. While this is a useful marketing technique, writing utensils are common and do not hold one's interest for long. Accordingly, there is a recurring need to provide writing utensils with unique features that catch the interest of users such that they prefer to keep the utensil rather than discarding it for another. By keeping the more interesting writing utensil in service longer, the marketing message provided through the writing utensil has a more powerful affect.

SUMMARY

The present invention teaches a unique writing utensil, such as a pen, having eye-catching features designed to attract and retain the attention of the user. In some embodiments, the writing utensil comprises a barrel having a writing end, a distal end opposite the writing end, and a body in between the writing end and the distal end. A capturing mechanism is fixedly attached to the barrel proximate the distal end and a first magnetic member having a first polarity is along the body between the capturing mechanism and the writing end. A second magnetic member having a second polarity is along the body between the capturing mechanism and the first magnetic member, and the first polarity is opposite the second polarity. The opposite polarity of the magnets causes the second magnetic member to hover or bounce along the barrel above the first magnetic member. In some cases, the second magnetic member may be elongated such that it presents a branding surface allowing it to display a brand or logo separate from any brand or logo that may otherwise appear on the barrel.

In other embodiments, the writing utensil comprises a writing end, a distal end opposite the writing end, an elongate body separating the writing end and the distal end, a first magnetic member along the body having a first polarity, a second magnetic member along the body between the first magnetic member and the distal end, the second magnetic member having a second polarity opposite the first polarity, and a capturing member fixed to the body at a point between the second magnetic member and the distal end. The capturing member may have a ferromagnetic component that attracts and holds the second magnetic member in a storage position when desired.

DETAILED DESCRIPTION

Figure 1:
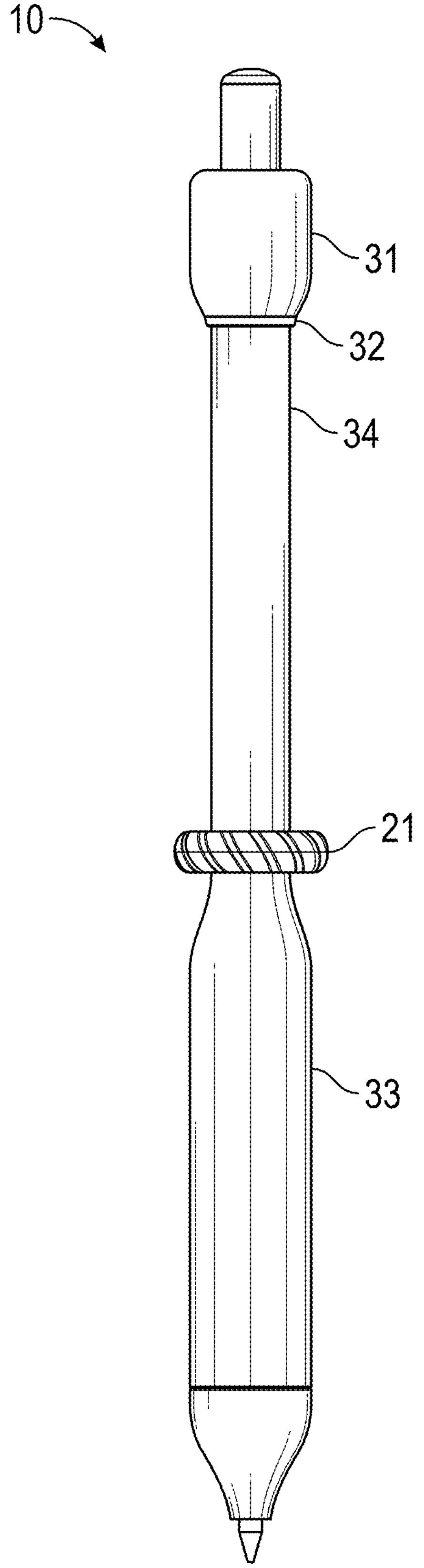
FIG. 1 is a front view of a writing utensil shown in a compressed configuration according to certain embodiments of the present invention.

The description that follows describes, illustrates and exemplifies one or more embodiments in accordance with its principles. This description is not provided to limit the disclosure to the embodiments described herein, but rather to explain and teach the principles of the inventions disclosed herein in order to enable one of ordinary skill in the art to understand these principles and, with that understanding, be able to apply them to practice not only the embodiments described herein, but also any other embodiment that may come to mind in accordance with these principles. The scope of the disclosure is intended to cover all such embodiments that may fall within the scope of the appended claims, either literally or under the doctrine of equivalents.

It should be noted that the drawings set forth herein are not necessarily drawn to scale and, in some instances, proportions may have been exaggerated to more clearly depict certain features. Positional references such as "upper" and "lower" may be used in regard to certain components to aid in understanding, but are not to be construed as limiting since these components may be oriented in various ways depending on the application in which they are used. As stated above, this specification is intended to be taken as a whole and interpreted in accordance with the principles of the invention(s) as taught herein and understood by one of ordinary skill in the art.

As shown in FIGS. 1 through 6, a writing utensil 10 is disclosed consisting of a barrel 13 having a writing end 13B opposite a distal end 13A. In this case, the writing utensil is a pen having a writing tip 40 that optionally ejects from or retracts into the barrel 13 at the writing tip 13B. Extending from the distal end 13A of the barrel is an ejector post 50 used to eject or retract the writing tip 40. The post 50 is connected to a spring (not shown) internal to the barrel 13 that presses on or pulls back on an ink cartridge 35 according to depression of the post 50. The writing tip 40 forms the end of the ink cartridge 35 opposite the post 50. Though a pen is illustrated in this embodiment, it will be appreciated by those of skill in the art that the principles of this invention disclosed below could be equally applied to any elongate writing utensil such as a pencil, a marker, or the like.

In between its distal end and writing end, barrel 13 has an elongate body having an upper portion 34 and a lower portion 33. The terms "upper" and "lower" are used merely for descriptive purposes because all of the views are shown with the pen in an upright position with the writing tip 40 down. However, this is also the general orientation in which the pen is used when writing. As shown, these portions have different circumference such that the upper portion 34 is narrower than the lower portion. The larger circumference of the lower portion 33 provides a more pleasing grip for a user to write, but as discussed below also serves to trap a magnetic member. The embodiment further comprises two magnetic members 11 and 20. Each magnetic member is of annular construction similar to a ring.

Figure 5:
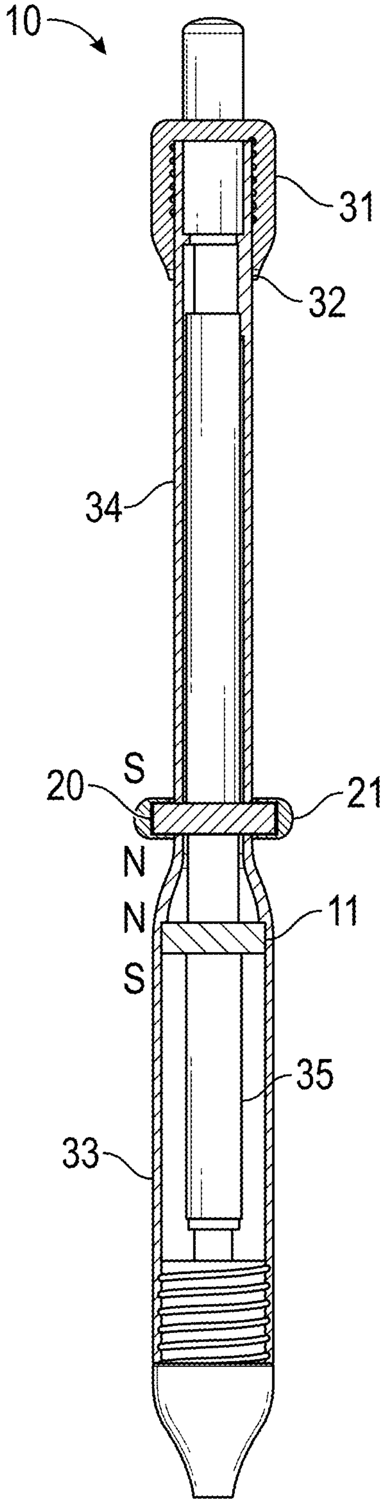
FIG. 5 is a partial front view of the writing utensil of FIG. 1 where the front half of the body and capturing mechanism of the barrel have been removed to reveal internal components.
Figure 6:
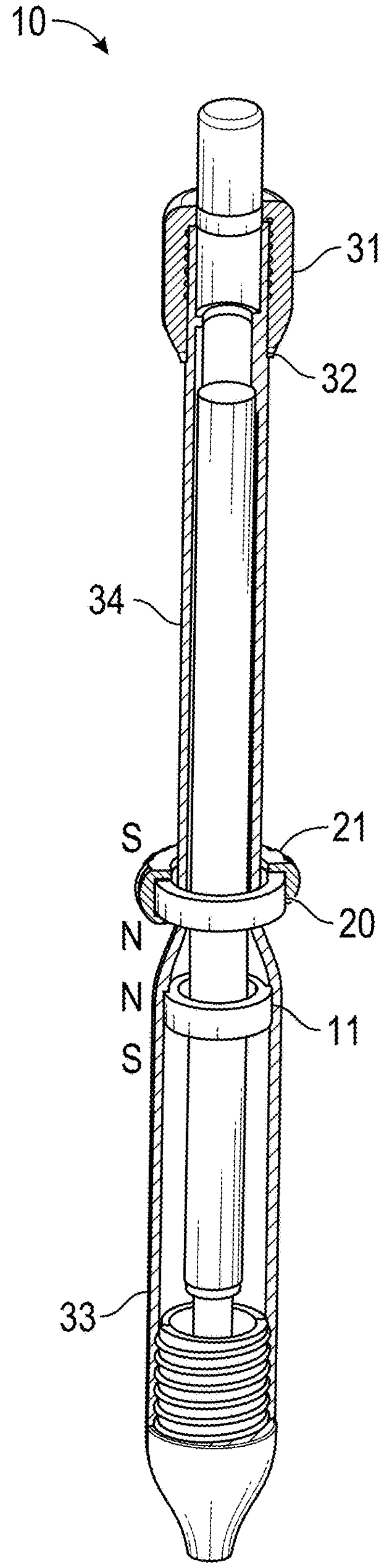
FIG. 6 is an elevated view of the partial view of FIG. 5.

The first magnetic member is captured within the lower portion of the body of barrel 13 such that it is not visible from the exterior (e.g., FIG. 2), but is shown in FIG. 5 where the barrel has been partially removed. As shown in FIGS. 5 and 6, magnetic member 11 is positioned around the ink cartridge 35, but not bonded to it such that ink cartridge 35 freely passes back and forth through magnetic member 11 as post 50 is actuated. However, magnetic member 11 is bonded (or otherwise fixed) to the inside of barrel 13, generally at the top of lower portion 33. Meanwhile, magnetic member 20 (also referred to herein as the "second magnetic member") is positioned around the outside of upper portion 34 of the body of barrel 13 and is free to move up and down the length of the upper portion 34. Magnetic member 20 may be coated with a covering layer 21 made of rubber, plastic or the like to provide it with texture and color or designs.

Importantly, as shown in FIGS. 5 and 6, the polarity of magnetic member 11 and magnetic member 20 are opposite. For example, note the "N" (north) and "N" of the magnetic members face each other, while the "S" (south) polarities of each magnetic member faces away from each other. As a result of this orientation, the magnetic members will repulse each other, having the effect that magnetic member 20 will be driven up and away from magnetic member 11 along the upper portion 34 of the barrel body.

Toward the distal end of the barrel 13 is a capturing mechanism 31 (which also may be referred to as an anti-detachment convex portion of the barrel). As shown, capturing mechanism 31 has an increased circumference from that of the upper portion 34, and is too large for the magnetic member 20 to pass over it. While the inner circumference of magnetic member 20 is large enough to pass over the upper portion 34 of the barrel body, it is not large enough to pass over lower portion 33. Accordingly, magnetic member 20 is trapped in between capturing mechanism 31 on one side and the lower portion 33 of the barrel body on the other.

Figure 2:
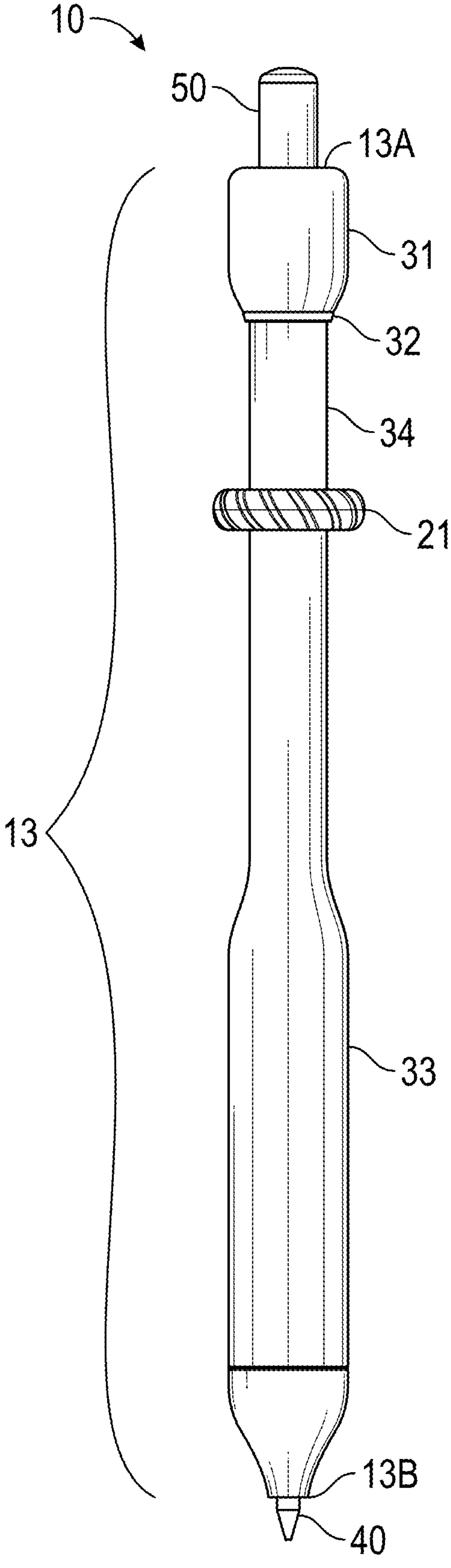
FIG. 2 is a front view of the writing utensil of FIG. 1, but shown in a floating configuration.

In a natural state, when the writing utensil 10 is upright, magnetic member 20 will appear to "hover" or "float" above the lower portion 33, such as shown in FIG. 2. This is referred to herein as the floating configuration. In the floating configuration, the position of magnetic member 20 will not be fixed because gravity will tend to pull the member 20 down toward the lower portion 33, while the opposing magnetic fields formed by the polarity of magnetic members 20 and 11 will tend to push member 20 back up toward the capturing mechanism. If held perfectly still, the member 20 will find equilibrium between these opposing forces at a point along the barrel 13. But when a user is writing, the slight but constant variations in the pen orientation will cause the effect of magnetic member 20 appearing to "bounce" as it moves back and forth across the equilibrium point.

Figure 4:
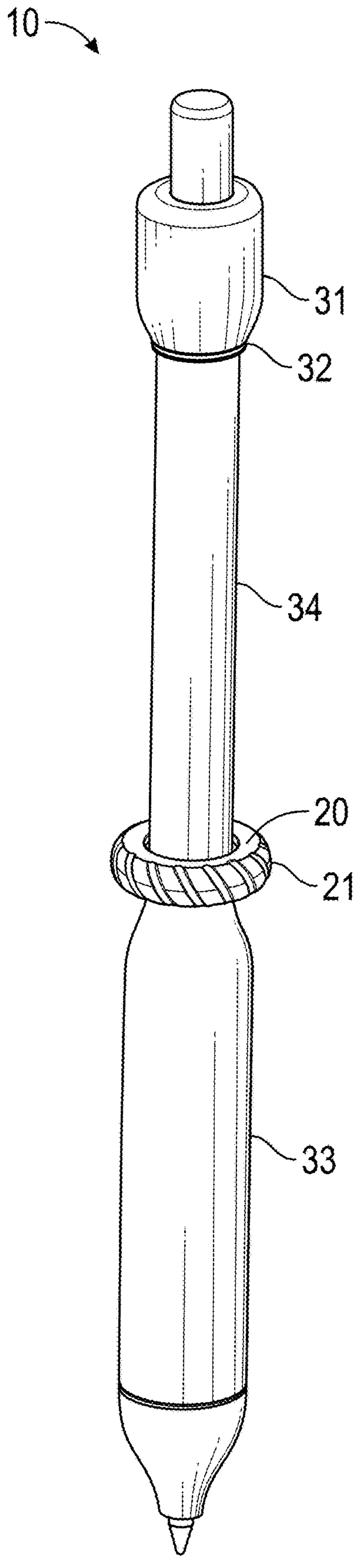
FIG. 4 is an elevated view of the writing utensil shown in FIG. 1 in the compressed configuration.

A user may also exacerbate this "bounce" effect by pulling magnetic member 20 down against the lower portion 33 into what is referred to herein as the compressed configuration (see FIGS. 1 and 4). In the compressed configuration, the potential energy of the opposing magnetic fields is at its strongest, such that releasing the magnetic member 20 will cause it to spring upward toward the capturing member 31, thereafter bouncing as gravity and magnetism work opposite one another until equilibrium is reached.

Figure 3:
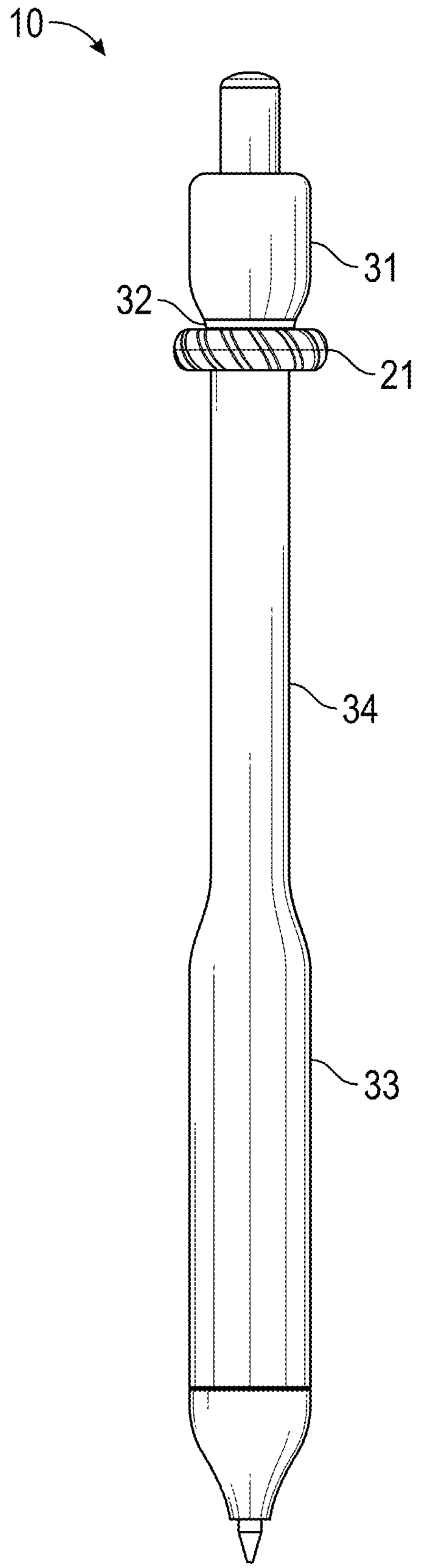
FIG. 3 is a front view of the writing utensil of FIG. 1, but shown in a captured configuration.

As shown in FIG. 5, capturing mechanism 31 may be screwed on to a threaded end of barrel 13. This allows magnetic member 20 to be inserted over the distal end 13A during assembly before the capturing mechanism 31 is installed. In some embodiments, capturing mechanism 31 may have a metal member 32 attached to its bottom edge (or edge facing the writing tip 40 once assembled). Metal member 32 is formed of a ferromagnetic material such that it is attracted to magnetic fields. Given the polar orientation of magnetic member 20 to push away from magnetic fields on its side facing writing tip 40, it will be attracted to a ferromagnetic material on its side facing the distal end of barrel 13. If magnetic member 20 reaches a point close enough to metal member 32, gravity will be overcome and the two components will be temporarily joined, such as shown in FIG. 3. This is referred to herein as the captured configuration.

In the captured configuration, magnetic member 20 will no longer hover or float along barrel 13, but rather will be held in place. This may be desirable, for example, when the user wants to concentrate on writing and not be distracted by the attention-gathering feature of the magnets. A user may quickly place the writing utensil 10 in to the captured configuration by simply turning the writing utensil 10 upside down, such that gravity works in concert with the magnetic forces between magnetic members 20 and 11 so as to drive magnetic member 20 into contact with the metal member 32 of capturing mechanism 31. In some configurations, capturing mechanism 31 itself may be made of a ferromagnetic material such that a separate metal member is not needed. However, this tends to add an undesired weight imbalance to the top of the writing utensil.

Figure 8:
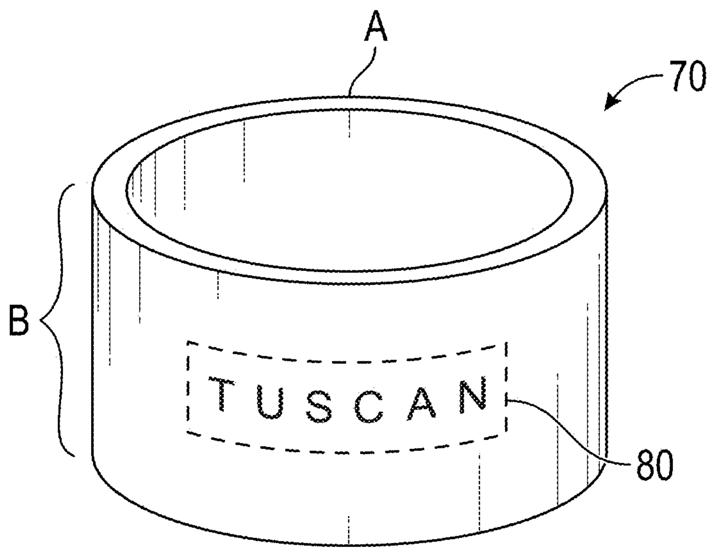
FIG. 8 is an isolated isometric view of a magnetic member with a branding surface according to certain embodiments.

A marketing message, brand or logo may be written along the lower portion 33 or upper portion 34 of the barrel body. But in some embodiments, such a message or design may also be inscribed on a floating magnetic member itself. FIG. 8 shows an isolated view of a magnetic member 70 such as second magnetic member 20 in the previous drawings. Magnetic member 70 has an inner circumference "A" configured to fit around the outer circumference of at least a portion of the barrel of a writing utensil. Though still annular, magnetic member 70 is slightly elongated to form a cylinder having a height "B." This allows magnetic member 70 to have a branding surface 80 for supporting a logo or brand.

In alternative embodiments, a lower magnetic member (such as magnetic member 11 in FIG. 3) could be of equal outside circumference as an upper magnetic member (such as magnetic member 20 in FIG. 3), but be bonded or otherwise fixed to the outside of the barrel 13. In this manner, there would need be no varying circumference between an upper and lower portion of barrel body. The grip portion of the barrel would be that portion below where the lower magnetic member is bonded to the barrel, and the upper magnetic member would still be captured and repelled from the lower magnetic member so as to "float" along the barrel portion between the lower magnetic member and a capturing mechanism at the barrel end.

Figure 7:
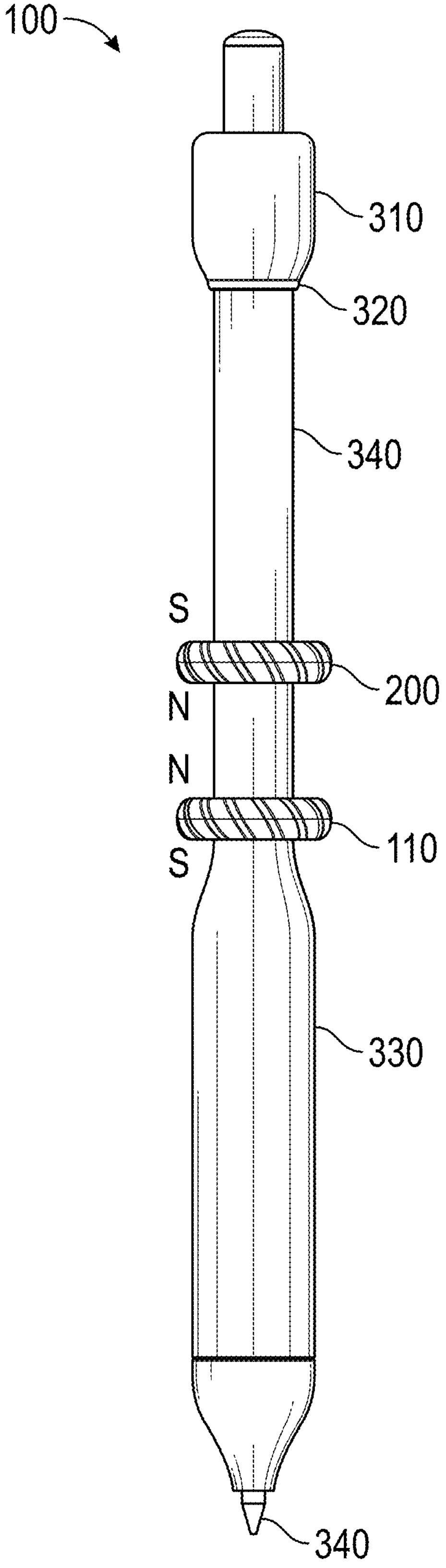
FIG. 7 is a front view of a writing utensil shown in a floating configuration according to certain other embodiments of the present invention.

FIG. 7 shows an alternative embodiment featuring writing utensil 100, which is like writing utensil 10 in traditional features such as barrel, ejector post and writing tip. Writing utensil 100 also has a lower portion 330 and upper portion 340 of a barrel where the lower portion has a larger circumference than the upper portion. However, writing utensil 100 features two magnetic members 110 and 200 that each have an inner circumference allowing them to pass over the upper portion 340, but not the lower portion 330. There is still a capturing mechanism 310 with a metal member 320. In this embodiment, both magnetic members 110 and 200 are free to "float" along the upper portion 340 of the barrel. Once again, they have opposite polarity, such that they will repel each other and at least magnetic member 200 will appear to "bounce" as it approaches equilibrium between gravity and the magnetic force repulsing it from magnetic member 110. Meanwhile, magnetic member 110 will "bounce" only when the writing utensil 100 is turned upside down such that the writing tip 340 points generally upward. Otherwise, magnetic member 110 will seat against the necking portion between upper portion 340 and lower portion 330 because gravity and the magnetic force will both hold it in that position. In this embodiment, the user may use magnetic member 110 to drive magnetic member 200 up and into contact with the metal member 320 by grabbing and pulling upward on magnetic member 110.

While specific embodiments of the invention have been described in detail, it will be appreciated by those skilled in the art that various modifications and alternatives to those details could be developed in light of the overall teachings of the disclosure. For example, the magnetic members need not be annular, and could be in the form of a pentagon, square, etc., so long as they feature a properly sized hole to allow movement over the barrel or passage of the ink cartridge, as the case may be. Accordingly, the particular arrangements disclosed are meant to be illustrative only and not limiting as to the scope of the invention which is to be given the full breadth of the appended claims and any equivalent thereof.

What is claimed is:

1. A writing utensil comprising:

a barrel having a writing end, a distal end opposite the writing end, and a body in between the writing end and the distal end;

a capturing mechanism fixedly attached to the barrel proximate the distal end;

a first magnetic member fixed to a point along the body between the capturing mechanism and the writing end such that the distance between the first magnetic member and the writing end is constant, the first magnetic member having a first polarity;

a second magnetic member along the body between the capturing mechanism and the first magnetic member, the second magnetic member having a second polarity;

wherein the first polarity is opposite the second polarity.

2. The writing utensil of claim 1, wherein the second magnetic member is not fixed to a point along the body and can move along a length of the body between the first magnetic member and the capturing mechanism.

3. The writing utensil of claim 2, wherein the capturing member comprises a ferromagnetic metal member fixed to an end of the capturing member that is facing away from the distal end of the barrel.

4. The writing utensil of claim 3, wherein the second polarity causes the second magnetic member to be magnetically attracted to the ferromagnetic metal member.

5. The writing utensil of claim 2, wherein the capturing member is formed of a ferromagnetic metal.

6. The writing utensil of claim 1, wherein the body is cylindrical and has a first circumference along at least an upper portion; and wherein the second magnetic member is annular and has an inner circumference that is greater than the first circumference.

7. The writing utensil of claim 6, wherein the body has a second circumference along a lower portion, wherein the lower portion is closer to the writing end than the upper portion, and wherein the second circumference is greater than the inner circumference.

8. The writing utensil of claim 7, wherein the first magnetic member is annular and has an outer circumference less than the second circumference, and wherein the first magnetic member is fixed to a point of the body along the lower portion such that it is covered by the body.

9. The writing utensil of claim 1, wherein the first magnetic member provides a branding surface for displaying a logo.

10. A writing utensil comprising:

a barrel having a writing end and a distal end opposite the writing end;

a cylindrical body portion of the barrel in between the distal end and the writing end, the cylindrical body portion having an upper portion proximate the distal end of the barrel with a first circumference and a lower portion proximate the writing end of the barrel with a second circumference that is greater than the first circumference; and a first annular magnetic member having a first polarity and an inner circumference that is greater than the first circumference but less than the second circumference, the first annular member positioned around the upper portion of the body portion of the barrel; and a second magnetic member having a second polarity that is opposite the first polarity, the second magnetic member positioned along the body portion between the first magnetic member and the writing end of the barrel.

11. The writing utensil of claim 10, wherein the second magnetic member is annular, has an inner circumference greater than the first circumference but less than the second circumference, and is positioned around the upper portion of the body portion of the barrel.

12. A writing utensil comprising:

a writing end;

a distal end opposite the writing end;

an elongate body separating the writing end and the distal end;

a first magnetic member along the body having a first polarity;

a second magnetic member along the body between the first magnetic member and the distal end, the second magnetic member having a second polarity opposite the first polarity; and a capturing member fixed to the body at a point between the second magnetic member and the distal end;

wherein at least one of the first magnetic member or the second magnetic member is configured to travel along at least a portion of an outer surface of the elongate body.

13. The writing utensil of claim 12, wherein the capturing member comprises a ferromagnetic metal portion facing toward the writing end.

14. The writing utensil of claim 13, having a stored configuration where the second magnetic member is magnetically joined to the ferromagnetic metal portion.

15. The writing utensil of claim 14, having a floating configuration in which, when the writing utensil is being used to write, the second magnetic member hovers a variable distance over the first magnetic member.

16. The writing utensil of claim 12, wherein the elongate body has a lower portion proximate the writing end with a wide diameter and an upper portion proximate the capturing member with a narrow diameter.

17. The writing utensil of claim 16, wherein the second magnetic member is annular and has an inner diameter that is greater than the narrow diameter, but less than the wide diameter.

18. The writing utensil of claim 17, wherein the second magnetic member wraps around and moves freely along the upper portion between the lower portion and the capturing member.

19. The writing utensil of claim 12, wherein the first magnetic member is fixed at a point along the elongate body and repels the second magnetic member away toward the capturing member.

20. The writing utensil of claim 19, wherein the second magnetic member is annular and has an inner diameter greater than an outer diameter of at least a portion of the elongated body, and wherein the second magnetic member wraps around the at least a portion of the elongated body such that the second magnetic member freely moves along the at least a portion of the elongated body between the first magnetic member and the capturing member.

* * * * *